US009869799B2

(12) United States Patent
Courtade et al.

(10) Patent No.: US 9,869,799 B2
(45) Date of Patent: Jan. 16, 2018

(54) OBJECT-BASED WELL CORRELATION

(71) Applicant: SCHLUMBERGER TECHNOLOGY CORPORATION, Sugar Land, TX (US)

(72) Inventors: Sergio Fabio Courtade, Heggedal (NO); Robert Messenger, Oslo (NO)

(73) Assignee: Schlumberger Technology Corporation, Sugar Land, TX (US)

( * ) Notice: Subject to any disclaimer, the term of this patent is extended or adjusted under 35 U.S.C. 154(b) by 623 days.

(21) Appl. No.: 14/480,548

(22) Filed: Sep. 8, 2014

(65) Prior Publication Data
US 2015/0073764 A1    Mar. 12, 2015

Related U.S. Application Data

(60) Provisional application No. 61/875,130, filed on Sep. 9, 2013.

(51) Int. Cl.
G06G 7/48       (2006.01)
G06G 7/50       (2006.01)
G01V 99/00      (2009.01)
G06T 17/05      (2011.01)

(52) U.S. Cl.
CPC ............ G01V 99/005 (2013.01); G06T 17/05 (2013.01); *G01V 99/00* (2013.01)

(58) Field of Classification Search
CPC .............................. G01V 99/005; G06T 17/05
USPC ....................................................... 703/9, 10
See application file for complete search history.

(56) References Cited

U.S. PATENT DOCUMENTS

| 7,986,319 B2 | 7/2011 | Dommisse et al. |
| 2003/0132934 A1 | 7/2003 | Fremming |
| 2003/0216897 A1 | 11/2003 | Endres et al. |
| 2009/0192718 A1 | 7/2009 | Zhang et al. |
| 2012/0029895 A1* | 2/2012 | Xi ........................ G01V 99/005 703/10 |
| 2012/0257796 A1* | 10/2012 | Henderson ............... G01V 1/32 382/109 |

(Continued)

FOREIGN PATENT DOCUMENTS

WO    2011102922 A1    8/2011

OTHER PUBLICATIONS

Miall, et al., "Architectural-element analysis: A new method of facies analysis applied to fluvial deposits", Earth-Science Reviews, vol. 22, Issue 4, Dec. 1985, pp. 261-308.

(Continued)

*Primary Examiner* — Andre Pierre Louis
(74) *Attorney, Agent, or Firm* — Alec J. McGinn

(57) ABSTRACT

Systems, methods, and computer-readable media geologic modeling are disclosed. For example, the method includes receiving an identification of a type of architectural element in association with a first well in a subterranean domain, based at least partially on data collected from the first well, and determining one or more characteristics of the type of architectural element. The method may also include defining, using a processor, an architectural element of the type of architectural element, in a representation of the subterranean domain and in association with the first well, based on the one or more characteristics, and displaying, using the processor and a display device in communication therewith, the architectural element intersecting the first well in a model.

18 Claims, 4 Drawing Sheets

(56) References Cited

U.S. PATENT DOCUMENTS

2013/0262061 A1* 10/2013 Laake .................... G01V 1/345
                                                                            703/6
2015/0219793 A1* 8/2015 Li ........................ G01V 99/005
                                                                            703/2

OTHER PUBLICATIONS

International Search Report and Written Opinion issued in PCT/US2014/054648 dated Dec. 20, 2014, 17 pages.

* cited by examiner

OBJECT-BASED WELL CORRELATION

CROSS-REFERENCE TO RELATED APPLICATION

This application claims the benefit of U.S. Provisional Patent Application Ser. No. 61/875,130 filed Sep. 9, 2013, which is incorporated herein by reference in its entirety.

BACKGROUND

In basin modeling, a model of a subterranean domain, e.g., describing the distribution of rock types therein, may be created based on well data (e.g., well logs) and modeling of the morphological process that the subterranean volume is likely to have undergone. Well data, such as gamma-ray well logs, other well logs, tests, etc., may provide direct, detailed data about a relatively minute volume of the domain of interest.

Interpretation of the well data may include identifying "well tops" in the logs. Well tops may be indicative of a surface of an architectural element, such as a channel, of the subterranean volume. Well tops may be linked together across multiple wells, which leads to one or more one-dimensional lines of interpretation, so as to develop an estimate of the geological characteristics of the subterranean volume between the wells. Further, an accurate interpretation may consider neighboring well tops, etc., according to various geological factors. In some cases, seismic data may be used to extend or enhance such interpretation.

Such well data may allow for an identification of depositional environments. Depositional environments can provide an indication of the sedimentary system and morphology of its building blocks, providing insight into the geology away from the wells. However, because the well data samples a volumetrically minute portion of the subsurface, interpretation processes may rely on extrapolation to generate a model of the structure of the geological features of the areas between the wells.

Correlation of the well data and modeling the deposition systems may be an iterative process. For example, the modeling stage may inform the interpretations, resulting in changed interpretations and, then, changed models. Further, in certain cases, a geologist may map architectural elements manually, or through memory, and determine well correlations, etc., based on such estimates, which may be inconvenient and/or a source of error.

SUMMARY

Systems, methods, and computer-readable media geologic modeling are disclosed. For example, the method includes receiving an identification of a type of architectural element in association with a first well in a subterranean domain, based at least partially on data collected from the first well, and determining one or more characteristics of the type of architectural element. The method may also include defining, using a processor, an architectural element of the type of architectural element, in a representation of the subterranean domain and in association with the first well, based on the one or more characteristics, and displaying, using the processor and a display device in communication therewith, the architectural element intersecting the first well in a model.

It will be appreciated that the foregoing summary is intended merely to introduce certain aspects of the disclosure. These and other aspects are more fully described below. As such, this summary is not intended to be limiting on the claims.

BRIEF DESCRIPTION OF THE DRAWINGS

The accompanying drawings, which are incorporated in and constitute a part of this specification, illustrate embodiments of the present teachings and together with the description, serve to explain the principles of the present teachings. In the figures.

DETAILED DESCRIPTION

Figure 1:
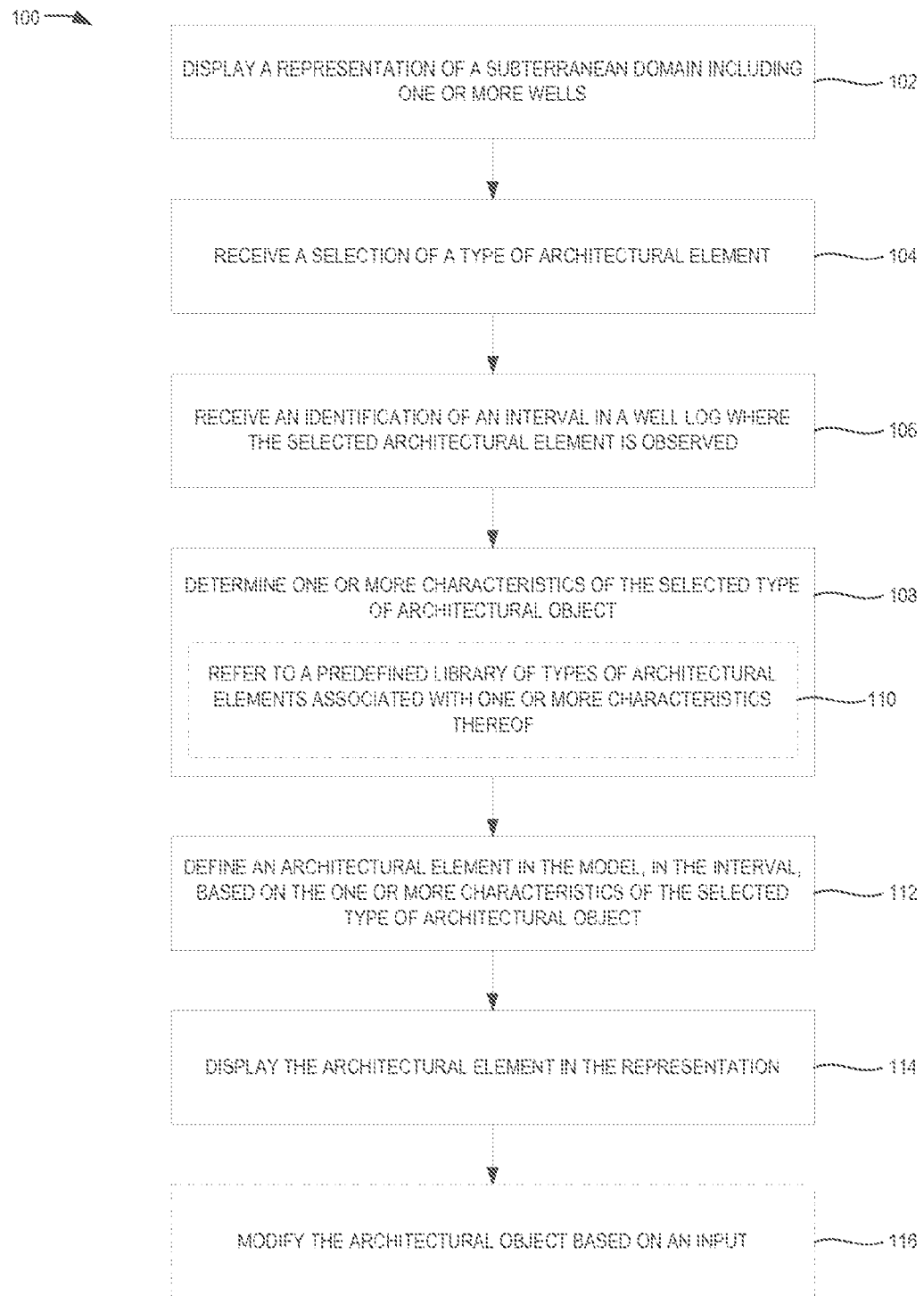
FIG. 1 illustrates a flowchart of a method for geologic modeling (e.g., including interpretation) using an architectural element analysis process, according to an embodiment.

The following detailed description refers to the accompanying drawings. Wherever convenient, the same reference numbers are used in the drawings and the following description to refer to the same or similar parts. While several embodiments and features of the present disclosure are described herein, modifications, adaptations, and other implementations are possible, without departing from the spirit and scope of the present disclosure.

Embodiments of the disclosure may provide for, among other things, visualization and modeling of objects identified in well data in a subterranean domain. The objects may be "architectural elements," which may include features, bodies, etc., of a formation that may be associated with a characteristic assemblage of lithofacies. Well data may provide information that is sufficient for a geologist to infer the presence of a type of architectural element in a particular depth interval in a rock formation surrounding a well. According to the present disclosure, this may be visualized in three-dimensions, e.g., in a representation of the subterranean domain, and, in some embodiments, along with any other architectural elements that are identified. The identified architectural element may be associated with the well (e.g., intersecting the well), and may be combined with fence data to result in a geobody representing the architectural element in the representation. Moreover, predetermined characteristics of the type of architectural elements identified may be employed, so as to inform the placement thereof in the representation.

Based certain factors, which are described in greater detail below, the geologist may make correlations between signatures in well data from different, e.g., neighboring wells, which may indicate that certain architectural elements intersect two or more wells. While honoring the predetermined characteristics of the type of architectural element, the geologist may then rapidly and easily expand the architectural element to intersect a second well, e.g., stretching or extending a single instantiation of the architectural element between wells based on correlations identified. Moreover, when observations run contrary or otherwise deviate from the predetermined characteristics of the architectural element, according to the present disclosure, the characteristics may be updated, and/or a new or "local" type of architectural element, with its associated characteristics, may be defined, for repeated use later.

Turning now to the now to the illustrated embodiments, FIG. 1 illustrates a flowchart of a method 100 for geological interpretation, according to an embodiment. The method 100 may begin by displaying a representation of a subterranean domain and one or more wells defined therein, as at 102. The representation may be, in one example, a visualization window created using an exploration and production (E&P) software platform such as SCHLUMBERGER PETREL® software. In other examples, other software platforms may be employed, without limitation. In an embodiment, the representation may be a three-dimensional visualization (e.g., depicted as a three-dimensional perspective on a two-dimensional display screen, or in three-dimensions using any type of three-dimensional display technology).

In some examples, the method 100 may also include receiving input and constructing the representation, e.g., through interaction with a geologist or another user. Such input may include parameters describing one or more wells, such as, for example, well log data. The representation may also include one or more fences constructed and extending between the wells. A "fence" may refer to a sequence of wells, e.g., along a vertical plane or series of planes that intersect two or more of the wells in the sequence. Before, during, or after such construction, the representation may be displayed at 102.

Figure 2:
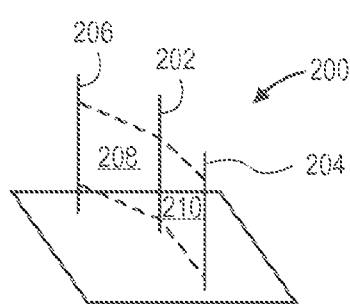
FIG. 2 illustrates a conceptual view of a three-dimensional visualization representation of a subterranean domain, according to an embodiment.

With continuing reference to FIG. 1, FIG. 2 illustrates a representation 200, for example, a visualization window (e.g., a three-dimensional visualization window), of a subterranean domain, according to an embodiment. As shown, the representation 200 may be a three-dimensional view, and may include one or more wells (three are shown: 202, 204, 206).

Such a three-dimensional view may allow the visual depiction of multiple fences. In the example illustrated, the representation 200 also includes fence portions 208, 210 extending between the wells 202-206. The fence portions 208, 210 may be part of the same fence, and may generally extend along a collinear path in plan view, or may define an angle therebetween, as shown. Further, the fence portions 208, 210 may contain interpreted, modeled, and/or seismic data regarding a planar region extending between the wells 202-206. In some cases, this data may be represented, e.g., using lines, colors, dashes, etc., in the display of the fences 208, 210 in the representation 210. In other embodiments, the fences 208, 210 may be omitted or included according to indicated user preferences, for example.

Referring again to FIG. 1, the method 100 may proceed to receiving a selection of a type of architectural element, as at 104. Architectural elements may be used in architectural element analysis, which is a system of developing a relatively location-agnostic classification of depositional systems. An architectural element may be associated with a distinctive assemblage of lithofacies; thus, when such assemblage of lithofacies is identified, the existence of the associated architectural element may be inferred. Between such lithofacies, there may in turn be distinctive relationships, such as an alternation or sequence. Since there may be a correspondence between well-log signatures and lithofacies, an architectural element may be defined by a high-resolution inspection of the well data. In various embodiments, the selection may be received at 104 via user interaction with an interface and an input peripheral, such as a mouse click, keystroke, gesture, voice command, etc. For example, one or more (e.g., a series of) drop-down menus may be displayed, allowing a user to navigate to a desired architectural element.

Figure 3:
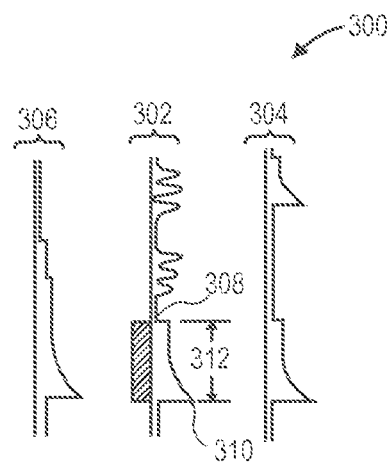
FIG. 3 illustrates a conceptual view of a well section window, showing well data collected from the wells of the domain depicted in FIG. 2, according to an embodiment.

FIG. 3 illustrates an example of a well section window 300, which may include well data such as one or more well logs (three are shown: 302, 304, 306), according to an embodiment. In at least one embodiment, the well logs 302-304 may each be collected at one of the wells 202, 204, 206, and may be, for example, gamma-ray well logs. Further, the well logs 302, 304, 306 may have certain signatures. For example, the well log 302 may include signatures 308, 310, which, to a geologist (or another automated or human interpreter), may provide an indication of a "well top," which may serve as a boundary of an architectural element of the subterranean domain. For example, the signatures 308, 310 may define an interval 312 that likely includes an architectural element.

The well section window 300 may be a quasi-spatial representation of the wells 202-206. Accordingly, the well logs 302-306 of the well section window 300 may be illustrated using different depth scales (e.g., vertical axis). Further, in some cases, the well logs 302-306 may be misaligned or "slipped" relative to one another, for a variety of reasons, such as to show a correlation between signatures. The space between the well logs 302-306 may be indicative of formation volume along the fence portions 208, 210 between the wells 202-206.

Figure 4:
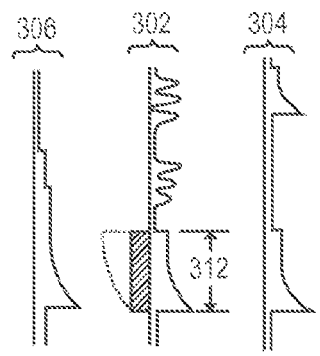
FIG. 4 illustrates another conceptual view of the well section window of FIG. 3, according to an embodiment.

Using the well logs 302-306 and/or other data available, a geologist (or any other user) may determine that the interval 312 includes a particular type of architectural element, and may provide an indication of such, which, in the method 100, may be received at 104, as noted above. As indicated in FIG. 4, before, during, or after such selection of the type of architectural element at 104, the user may also identify the interval 312 in the well log 302 where the selected type of architectural element is observed, which may be received in the method 100, as at 106. In some cases, this may be referred to as "painting" the interval 312. In the illustrated case, the painted interval 312 is in the well log 302, which is associated with the first well 202. Such an indication may be received via one or more drop-down menus, radio buttons, keystrokes, etc.

Figure 5:
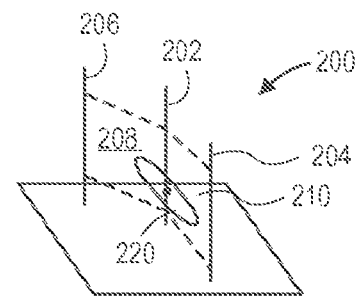
FIG. 5 illustrates a conceptual view of the visualization of the subterranean domain including a geobody, according to an embodiment.

Once a type of architectural element and interval has been identified, inferences may be made about the size and morphology of the architectural element in the subterranean domain. This may allow rendering of a two- or three-dimensional geobody 220, indicating the architectural element in the representation 200, as shown in FIG. 5. To reach such inferences, the method 100 may include determining one or more characteristics of the selected type of architectural element, as at 108. In a specific embodiment, this may include referring to a library of types of architectural elements, as at 110. In particular, such a library may include a table and/or other database structure, which may link or otherwise associate one or more (e.g., a variety) of types of architectural elements to one or more characteristics associated therewith.

An example of such a library may be as follows, however, again, it will be appreciated that any database structure, e.g., table, etc., may be employed for the library, e.g., as stored in a computer-readable medium such as volatile or non-volatile memory, a hard disk, etc. Moreover, the following list of architectural elements is not to be considered exhaustive.

TABLE 1

Library of Architectural Element Characteristics

| Architectural Element | Lithofacies | Geometry & relationships |
|---|---|---|
| Channel | Any | Finger, lens or sheet; concave-up erosional base; scale & shape highly variable |
| Gravel bars & bedforms | Gravelly | Lens, blanket; usually tabular bodies; commonly interbedded with Sandy bedforms |
| Sandy bedforms | Sandy | Lens, sheet, blanket wedge; occurs in channels or as crevasse splays |
| Foreset macroforms | Sandy | Lens resting on flat or channeled base, with convex-up upper surface |
| Lateral accretion deposits | Sandy-gravelly | Wedge, sheet, lobe |
| Sediment gravity flows | Gravelly | Lobe, sheet; typically interbedded with Gravelly bedforms |
| Laminated sand sheets | Sandy | Sheet, blanket |
| Overbank fines | Muddy, silty | Thin to thick blankets; commonly interbedded with Sandy bedforms |

Based on these characteristics and the identified interval 312, the method 100 may include defining an architectural element in the representation 200 of the seismic domain, as at 112. Such a defining process may include extrapolation based on the characteristics, in order to produce, e.g., a three-dimensional body 220 in the representation 200. For example, the method 100 may include, e.g., as a default, assuming that the intersection with the well 202 associated with the identified interval 310 is at the center of the architectural element. Further, the method 100 may rely on an intersection with one or more fences 208, 210 to draw the architectural element in the representation 200.

The method 100 may then proceed to displaying the defined architectural element in the representation 200, as at 114. As noted above, this may result in the three-dimensional geobody 220 of FIG. 5, which is illustrated as centered on the first well 202, with which it is associated. The depicted geobody 220 may honor the size and morphology of the geobody 220, e.g., as defined using the characteristics of the architectural element. In other embodiments, however, the depicted geobody 220 may be an approximation of the geobody 220 form, for example, a depiction of a convex hull of the geobody 220. The convex hull may result in a "blob" shaped depiction of the geobody 220, which may provide an area of the subterranean domain in which the architectural element fits, e.g., neglecting recessed portions of the architectural element.

Considering the well logs 302, 304, 306 further, if the user or processor observes additional architectural elements, the method 100 may loop back to receiving the selection, as at 104 and proceed through the subsequent aspects of the method 100, e.g., iteratively. Such iteration may continue until no further architectural elements are observed. This may result in a plurality of geobodies (like the geobody 220) being displayed in the representation 200.

In some cases, one or more of the characteristics of the one or more of the architectural elements may be modified, as at 116. For the sake of illustration, the first architectural element is described as being modified herein, but it will be appreciated that such modification may apply to any architectural element defined and displayed according to an embodiment of the method 100.

Figure 7:
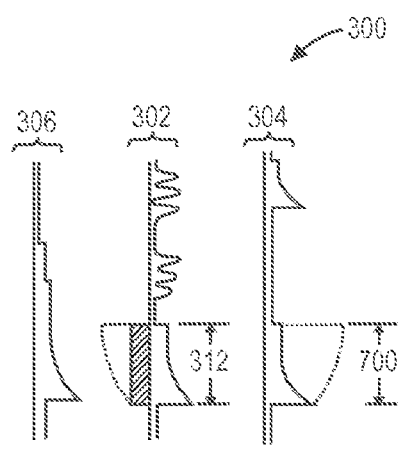
FIG. 7 illustrates another conceptual view of the well section window of FIGS. 3 and 4, according to an embodiment.

For example, the architectural element, displayed as the geobody 220 in FIG. 5 may be identified as intersecting another well, such as, for example, the second well 204. Accordingly, considering FIG. 8, there is shown a flowchart of an example of modifying the architectural element, as at 116 (FIG. 1). The modification processor 116 may begin by receiving an identification of an interval of a second well where the architectural element is located, as at 600. The architectural element identified at 600 may also be associated with another well, e.g., the first well 202. For example, referring to FIG. 7, interval 700 may be identified in well log 304, which, as noted above, is associated with data collected from the second well 204.

The modifying process 116 may then proceed to defining a second instantiation of the architectural element at the interval 700 in the well data 304 associated with the second well 204, as at 602. For example, a second geobody associated with the third well 206, at the interval 700, may be formed. The first and second instantiations of the architectural element may then be connected together, as at 604, e.g., to create a single amalgamation of the first and second instantiations, with the amalgamation honoring the one or more characteristics of the type of architectural element, while extending between the two wells 204, 206. Moreover, in some cases, the shape of the first instantiation and/or the shape of the second instantiation may be modified, as at 606 to effect such amalgamation.

In a specific embodiment, the amalgamation of the first and second instantiations may include changing the display thereof to a convex hull, from a shape that generally honored the characteristics of the architectural element(s). The convex hulls, as mentioned above, are related to, but may not entirely honor, the characteristics of the architectural element. Further, a thickness-to-width ratio of the architectural element may be modified to support the connection. The method 100 may then adjust the representation, so as to display the architectural element in its new form, extending between the two wells 206, 208.

Figure 8:
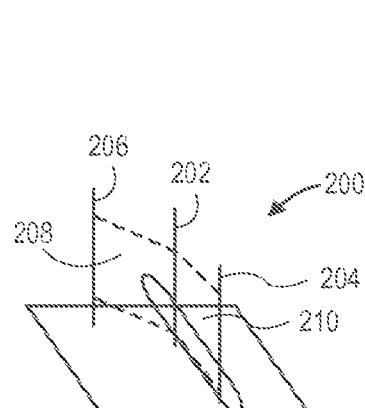
FIG. 8 illustrates another conceptual view of the visualization of the subterranean domain with the geobody extending between two wells, according to an embodiment.
Figure 6:
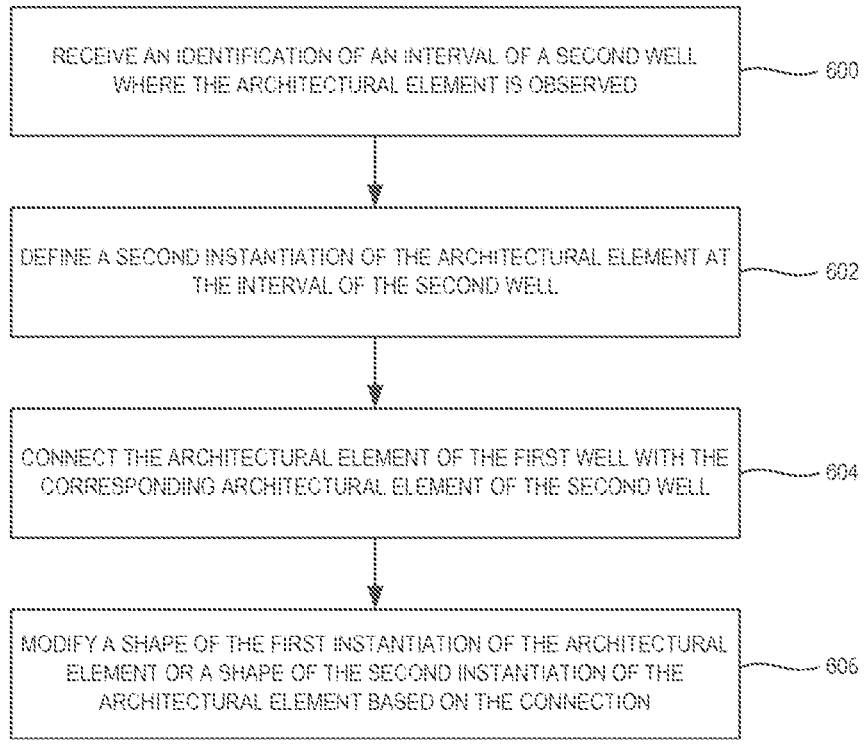
FIG. 6 illustrates a flowchart of a modification process for the architectural element, according to an embodiment.

FIG. 8 illustrates the geobody 220, representing the architectural element, extending between the first and second wells 204, 206, according to such a process. In another example, a user may select and drag the geobody 220, which may stretch the geobody 220, such that it intersects the second well 204. In some cases, this may occur in conjunction with receiving an indication of the interval 700, such that the representation 200 may be modified, e.g., in real-time, responsive to user input. It will be appreciated that this stretching/amalgamation process may be repeated such that the architectural element intersects three or more wells.

Figure 9:
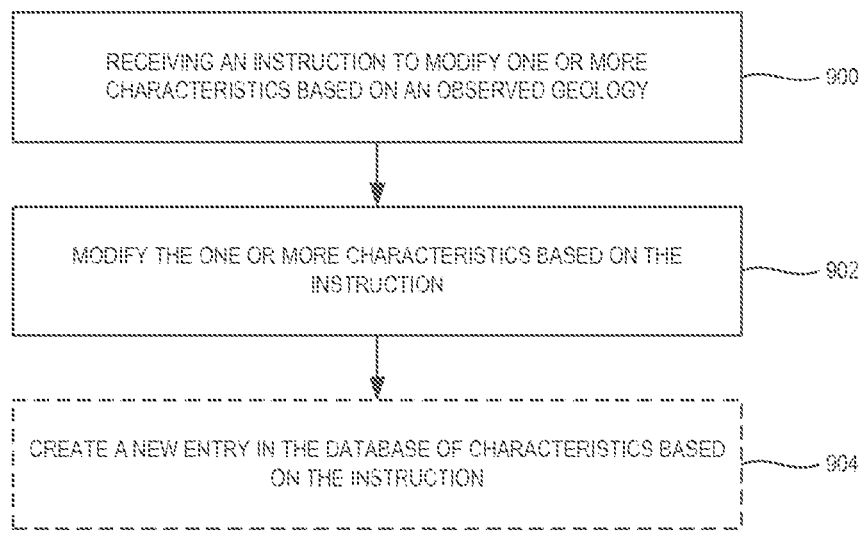
FIG. 9 illustrates a flowchart of another modification process for the architectural element, according to an embodiment.

FIG. 9 illustrates a flowchart of another modification process 116, according to an embodiment. In this case, the modification process 116 may begin by receiving an instruction to modify one or more of the characteristics of the architectural element, for example, based on an observed geology, as at 900. For example, the determination that one architectural element exists may influence the determination of the characteristics of another, e.g., adjacent architectural element. This may become apparent when the architectural element is depicted in the representation 200 (e.g., as the geobody 220), which provides a convenient way to organize the catalogue of architectural elements interpreted to be in the subterranean domain. Such instructions may be received via input peripheral devices, such as mouse clicks, keystrokes, gestures, etc., and may be prompted or guided through the use of an interface displayed to the user.

For example, there may be some parameters that may be appreciated based on observations of the local subterranean environment, e.g., in view of identification of neighboring lithofacies and/or architectural elements, which may call for deviations from the standard set of characteristics provided by the library. Based on such information, one or more characteristics associated with the type of architectural element may be modified, as at 902. In some cases, such modifications may be stored for later use. For example, the characteristics associated with the type of architectural element may be modified. In another example, a new entry in the database (library) of characteristics may be created, as at 904. Such new entry may provide a local type of architectural element, which may be used for later instantiations.

In at least one example, the initial characteristics (left column of Table 2, below) may be replaced or refined using certain observed characteristics (right column of Table 2, below). As with Table 1, however, it will be appreciated that the following elements of the library are not to be considered exhaustive or limiting. Libraries are contemplated including a subset of the following elements, with or without combination with other elements not listed below.

TABLE 2

Library and Observed Properties

| Library | Observed |
|---|---|
| Shape (plan) | Shape (plan) |
| Shape (longditudinal) | Shape (longditudinal) |
| Shape (transversal) | Shape (transversal) |
| Relative width/thickness, length/width | Absolute width, length & thickness |
| Upper & lower width, length & thickness bounds | |
| Erosion priority | Erosion priority |
| | Orientation |
| | Reference surface |

Accordingly, embodiments of the present disclosure may provide a system and method that provide a three-dimensional canvas for visualization and platform integration in geologic interpretation and modeling. This may provide opportunities for refining interpretations such as incorporation of non-sedimentary controls, such as faults and paleo-topographic surfaces, co-interpretation with seismic data, integration with seismic volume interpretation workflows, and direct interpretation of object orientation and channel pathways, among other possibilities.

Figure 10:
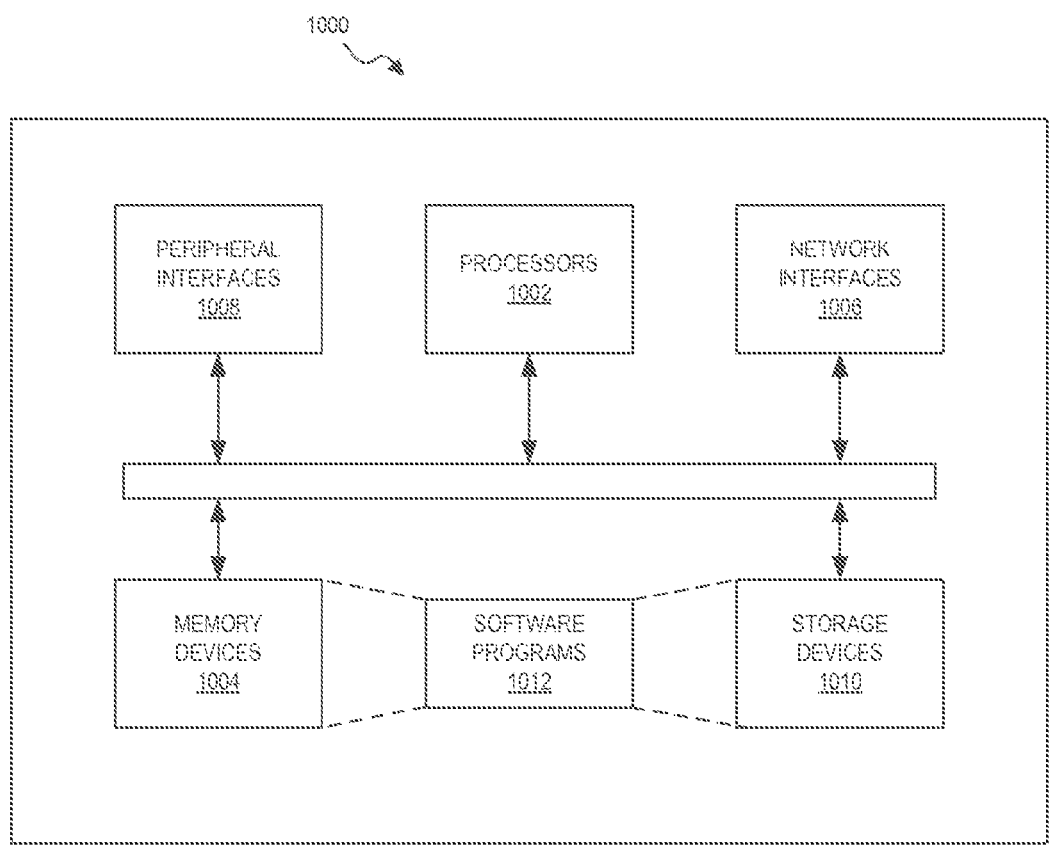
FIG. 10 illustrates a schematic view of a computing system, according to an embodiment.

Embodiments of the disclosure may also include one or more systems for implementing one or more embodiments of the method of the present disclosure. FIG. 10 illustrates a schematic view of such a computing or processor system 1000, according to an embodiment. The processor system 1000 may include one or more processors 1002 of varying core (including multiple-core) configurations and clock frequencies. The one or more processors 1002 may be operable to execute instructions, apply logic, etc. It will be appreciated that these functions may be provided by multiple processors or multiple cores on a single chip operating in parallel and/or communicably linked together.

The processor system 1000 may also include a memory system, which may be or include one or more memory devices and/or computer-readable media 1004 of varying physical dimensions, accessibility, storage capacities, etc. such as flash drives, hard drives, disks, random access memory, etc., for storing data, such as images, files, and program instructions for execution by the processor 1002. In an embodiment, the computer-readable media 1004 may store instructions that, when executed by the processor 1002, are configured to cause the processor system 1000 to perform operations. For example, execution of such instructions may cause the processor system 1000 to implement one or more portions and/or embodiments of the method 100 described above.

The processor system 1000 may also include one or more network interfaces 1006. The network interfaces 1006 may include any hardware, applications, and/or other software. Accordingly, the network interfaces 1006 may include Ethernet adapters, wireless transceivers, PCI interfaces, and/or serial network components, for communicating over wired or wireless media using protocols, such as Ethernet, wireless Ethernet, etc.

The processor system 1000 may further include one or more peripheral interfaces 1008, for communication with a display screen, projector, keyboards, mice, touchpads, sensors, other types of input and/or output peripherals, and/or the like. In some implementations, the components of processor system 1000 need not be enclosed within a single enclosure or even located in close proximity to one another, but in other implementations, the components and/or others may be provided in a single enclosure.

The memory device 1004 may be physically or logically arranged or configured to store data on one or more storage devices 1010. The storage device 1010 may include one or more file systems or databases in any suitable format. The storage device 1010 may also include one or more software programs 1012, which may contain interpretable or executable instructions for performing one or more of the disclosed processes. When requested by the processor 1002, one or more of the software programs 1012, or a portion thereof, may be loaded from the storage devices 1010 to the memory devices 1004 for execution by the processor 1002.

Those skilled in the art will appreciate that the above-described componentry is merely one example of a hardware configuration, as the processor system 1000 may include any type of hardware components, including any necessary accompanying firmware or software, for performing the disclosed implementations. The processor system 1000 may also be implemented in part or in whole by electronic circuit components or processors, such as application-specific integrated circuits (ASICs) or field-programmable gate arrays (FPGAs).

The foregoing description of the present disclosure, along with its associated embodiments and examples, has been presented for purposes of illustration only. It is not exhaustive and does not limit the present disclosure to the precise form disclosed. Those skilled in the art will appreciate from the foregoing description that modifications and variations are possible in light of the above teachings or may be acquired from practicing the disclosed embodiments.

For example, the same techniques described herein with reference to the processor system 1000 may be used to execute programs according to instructions received from another program or from another processor system altogether. Similarly, commands may be received, executed, and their output returned entirely within the processing and/or memory of the processor system 1000. Accordingly, neither a visual interface command terminal nor any terminal at all is strictly necessary for performing the described embodiments.

Likewise, the steps described need not be performed in the same sequence discussed or with the same degree of separation. Various steps may be omitted, repeated, combined, or divided, as necessary to achieve the same or similar objectives or enhancements. Accordingly, the present disclosure is not limited to the above-described embodiments, but instead is defined by the appended claims in light of their full scope of equivalents. Further, in the above description and in the below claims, unless specified otherwise, the term "execute" and its variants are to be interpreted as pertaining to any operation of program code or instructions on a device, whether compiled, interpreted, or run using other techniques.

What is claimed is:

1. A method for geologic modeling, comprising:
   receiving an identification of a type of architectural element in association with a first well in a subterranean domain, based at least partially on data collected from the first well;
   determining one or more characteristics of the type of architectural element;
   defining, using a processor, an architectural element of the type of architectural element, in a model representing the subterranean domain and in association with the first well, based on the one or more characteristics;
   defining a fence intersecting the first well and a second well; and
   displaying, using the processor and a display device in communication therewith, a representation of the model, wherein the architectural element intersects the first well in the model, and wherein displaying comprises displaying a geobody intersecting the fence in the model, the geobody representing one or more characteristics of the type of architectural element.

2. The method of claim 1, wherein displaying comprises displaying the model as a three-dimensional visualization, the geobody being a three-dimensional geobody in the three-dimensional visualization.

3. The method of claim 1, wherein defining the architectural element comprises centering the architectural element on the first well and intersecting a fence with the architectural element.

4. The method of claim 1, further comprising:
   receiving an identification of the architectural element in association with a second well in the subterranean domain, based at least partially on data collected from the second well; and
   extending the architectural element based on at least one of the one or more characteristics, such that the architectural element intersects the first well and the second well in the representation; and
   displaying the architectural element intersecting the first well and the second well and extending therebetween.

5. The method of claim 1, further comprising:
   receiving a modification instruction from a user via an interaction with the representation; and
   adjusting the architectural element based on the modification instruction.

6. The method of claim 1, wherein the data collected from the first well comprises a well log collected from the first well.

7. The method of claim 1, wherein determining the one or more characteristics comprises obtaining the one or more characteristics from a database comprising a plurality of types of architectural elements each associated with one or more characteristics.

8. The method of claim 1, further comprising:
   defining and displaying a plurality of architectural elements, including the architectural element; and
   modifying the architectural element based on one or more others of the plurality of architectural elements.

9. The method of claim 1, wherein the architectural element is selected from the group consisting of channels, gravel bars and bedforms, sandy bedforms, foreset macroforms, lateral accretion deposits, sediment gravity flows, laminated sand sheets, and overbank fines.

10. A computing system, comprising:
    one or more processors;
    a display device coupled with the one or more processors and configured to display an image; and
    a memory system comprising one or more computer-readable media storing thereon instructions that, when executed by at least one of the one or more processors, cause the computing system to perform operations, the operations comprising:
       receiving an identification of a type of architectural element in association with a first well in a subterranean domain, based at least partially on data collected from the first well;
       determining one or more characteristics of the type of architectural element;
       defining an architectural element of the type of architectural element, in a model of the subterranean domain and in association with the first well, based on the one or more characteristics, wherein defining the architectural element comprises defining the architectural element as intersecting a fence of the model; and
       displaying, using the display device, a three-dimensional geobody representing the architectural element in a three-dimensional visualization that is a representation of the model, wherein the geobody is displayed as intersecting the fence.

11. The system of claim 10, wherein the operations further comprise:
    receiving an identification of the architectural element in association with a second well in the subterranean domain, based at least partially on data collected from the second well; and extending the architectural element based on at least one of the one or more characteristics, such that the architectural element intersects the first well and the second well in the representation; and displaying, using the display device, the geobody intersecting the first well and the second well and extending therebetween.

12. The system of claim 10, wherein the operations further comprise:

receiving a modification instruction from a user via an interaction with the representation;

adjusting the architectural element based on the modification instruction; and adjusting the geobody in the model based on the adjustment to the architectural element.

13. The system of claim 10, wherein the data collected from the first well comprises a well log collected from the first well, and wherein the operations further comprise displaying the well log in a well section window.

14. The system of claim 10, wherein the model is a three-dimensional visualization of the subterranean domain.

15. The system of claim 10, wherein determining the one or more characteristics comprises obtaining the one or more characteristics from a database comprising a plurality of types of architectural elements each associated with one or more characteristics.

16. The system of claim 10, wherein the operations further comprise:

defining a plurality of architectural elements, including the architectural element;

displaying a plurality of geobodies, including the geobody, wherein respective geobodies represent respective architectural elements; and modifying the architectural element based on one or more others of the plurality of architectural elements.

17. The system of claim 10, wherein the architectural element is selected from the group consisting of channels, gravel bars and bedforms, sandy bedforms, foreset macroforms, lateral accretion deposits, sediment gravity flows, laminated sand sheets, and overbank fines.

18. A non-transitory computer-readable medium storing instructions that, when executed by one or more processors, cause the one or more processors to perform operations, the operations comprising:

causing a display device to display a three-dimensional visualization of a subterranean domain, the visualization including representations of a plurality of wells and a fence intersecting the plurality of wells;

causing the display device to display a well section window including well logs collected in the plurality of wells, wherein the well logs are displayed in a quasi-spatial relationship;

receiving an indication of an interval in one of the well logs displayed in the well section window, the interval being associated with a first well of the plurality of wells;

receiving an identification of a type of architectural element in association with the interval;

determining one or more characteristics of the type of architectural element;

defining an architectural element of the type of architectural element, using the one or more characteristics of the type of architectural element; and causing the display device to display a three-dimensional geobody intersecting the first well and the fence, at least partially in the interval, and visually representing one or more of the characteristics of the architectural element.

* * * * *